United States Patent [19]

Wood et al.

[11] Patent Number: 4,999,779
[45] Date of Patent: Mar. 12, 1991

[54] AXLE HEALTH DISCRIMINATORY SAFETY TIMER ARRANGEMENT FOR CONTROLLING WHEEL SLIP ON A MULTIPLE-AXLE RAILWAY VEHICLE

[75] Inventors: James A. Wood, Spartanburg; John W. Drake, Greenville, both of S.C.

[73] Assignee: American Standard Inc., Spartanburg, S.C.

[21] Appl. No.: 408,822

[22] Filed: Sep. 18, 1989

[51] Int. Cl.⁵ .............................................. G06F 7/70
[52] U.S. Cl. ............................... 364/426.03; 180/197; 303/92; 303/102
[58] Field of Search .......................... 364/569, 426.03; 180/197; 303/7, 92, 93, 95

[56] References Cited
U.S. PATENT DOCUMENTS

| | | | |
|---|---|---|---|
| 4,677,580 | 6/1987 | Saluski | 364/569 |
| 4,729,608 | 3/1988 | Fennel et al. | 180/197 X |
| 4,760,893 | 8/1988 | Sigl et al. | 364/426.03 X |
| 4,781,265 | 11/1988 | Weiler et al. | 364/426.03 X |
| 4,794,538 | 12/1988 | Cao et al. | 364/426.03 X |
| 4,796,211 | 1/1989 | Yokouchi et al. | 364/569 |
| 4,825,371 | 4/1989 | Hoashi et al. | 180/197 X |
| 4,873,638 | 10/1989 | Shiraishi et al. | 364/426.03 X |
| 4,919,494 | 4/1990 | Higashimata et al. | 303/102 X |

FOREIGN PATENT DOCUMENTS 0270092  6/1988  European Pat. Off. ....... 364/426.03

Primary Examiner—Joseph L. Dixon
Attorney, Agent, or Firm—J. B. Sotak

[57] ABSTRACT

An axle health discriminatory safety timer arrangement for a railway vehicle braking system including a first logic network connected to a pair of safety timers. The pair of safety timers being connected to a second logic network. The second logic network being connected to a pair of speed difference threshold detection sensors. The pair of speed difference detection sensors being connected to a third logic network. The third logic network being connected to a pair of output circuits. The pair of safety timers are also connected to a fourth logic network. A fifth logic network being connected to the third logic network and also being connected to a sixth logic network. The sixth logic network is connected to a pair of truck cutout circuits for nullifying the slip control on a multiple-truck vehicle for preventing an extended period of time of release of the brake cylinder pressure.

30 Claims, 3 Drawing Sheets

AXLE HEALTH DISCRIMINATORY SAFETY TIMER ARRANGEMENT FOR CONTROLLING WHEEL SLIP ON A MULTIPLE-AXLE RAILWAY VEHICLE

FIELD OF THE INVENTION

The present invention relates to an axle health discriminatory safety timer arrangement which functions to nullify or cancel the wheel slip control operation on a per truck basis during certain malfunctions that could cause a possible extended period of time of release of the brake cylinder pressure.

BACKGROUND OF THE INVENTION

In previous types of transportation systems, such as, in high speed railway and/or mass and rapid transit operations, the equipment included a portion called a "H-1 Electronic Unit", which functions to interpret electrical and pneumatic input signals and converts these signals into electrical output signals required for the control of service brake, wheel slip control, annunciation, and certain malfunction indications. The H-1 electronic unit included a watchdog timer which is designed to monitor the operation and condition of the equipment. In the past, the watchdog timer did not work with or control the dump valves of the braking system of the railway vehicle. In practice, the conventional safety timer normally was a standard five (5) second timer which consisted of an R-C network and an electromagnetic relay. This type of approach appeared to be adequate when the control system was relatively simple and unsophisticated. However, upon further review and testing, it was found that this former safety timer was inadequate in that the timer could erroneously be placed in a reset condition by a table enable timeout or by an application pulse which is used during a slip correction which can create a condition of extended release of the brake cylinder pressure. Such an inadvertent reset is unacceptable in the present sophisticated state-of-the-art safety timers.

OBJECTS AND SUMMARY OF THE INVENTION

Accordingly, it is an object of this invention to provide a new and improved safety timer which is protected against a false reset by a table enable timeout or an application pulse during a slip condition.

Another object of this invention is to provide a unique safety timer arrangement in which an open, short, or component fault in the circuit will result in the deenergization of the watchdog timer and cause the disconnection of communication between the wheel slip control valve and the electronic unit.

A further object of this invention is to provide a safety timer which is controlled by a central processing unit (CPU) which emits a certain frequency so that if the microprocessor program is not operating properly, the appropriate frequency of pulse causes the safety timer to disconnect communication between the electronic unit and the wheel slip control valves.

Still another object of this invention is to provide a new watchdog timer circuit which functions to negate the wheel slip control on a per-truck basis during the occurrence of a malfunction which could result in an extended release of the brake cylinder pressure of a railway vehicle.

Still a further object of this invention is to provide an axle health discriminatory safety timer arrangement which is reliable in operation, durable in use, efficient in service, and effective in execution.

In accordance with the present invention, there is provided an axle health discriminatory safety timer arrangement comprising, a first logic network connected to a pair of safety timers, the pair of safety timers are connected to a second logic network, the second logic network is connected to a pair of speed difference threshold detection sensors, the pair of speed difference threshold detection sensors are connected to a third logic network, the third logic network is connected to a pair of output circuits, the pair of safety timers are also connected to a fourth logic network, a fifth logic network is connected to the third logic network and also to a sixth logic network, and the sixth logic network is connected to a pair of truck cutout circuits for nullifying the slip control on a multiple-truck vehicle for preventing an over-extended period of time of release of the brake cylinder pressure.

Further, according to this invention, there is provided an axle health discriminatory safety timer arrangement comprising, a first logic means controlling a pair of safety timers, said pair of safety timers connected to a second logic means, said second logic means controlling a pair of speed difference threshold detection sensors, said pair of speed difference detection sensors connected to a third logic means, said third logic means controlling a pair of output circuits, said pair of safety timers are also connected to a fourth logic means, a fifth logic means connected to said third logic means and also to a sixth logic means, and said sixth logic means controlling a pair of truck cutout circuits to nullify the slip correction on a multiple-truck vehicle for preventing an over-extended period of time of release of the brake cylinder pressure.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
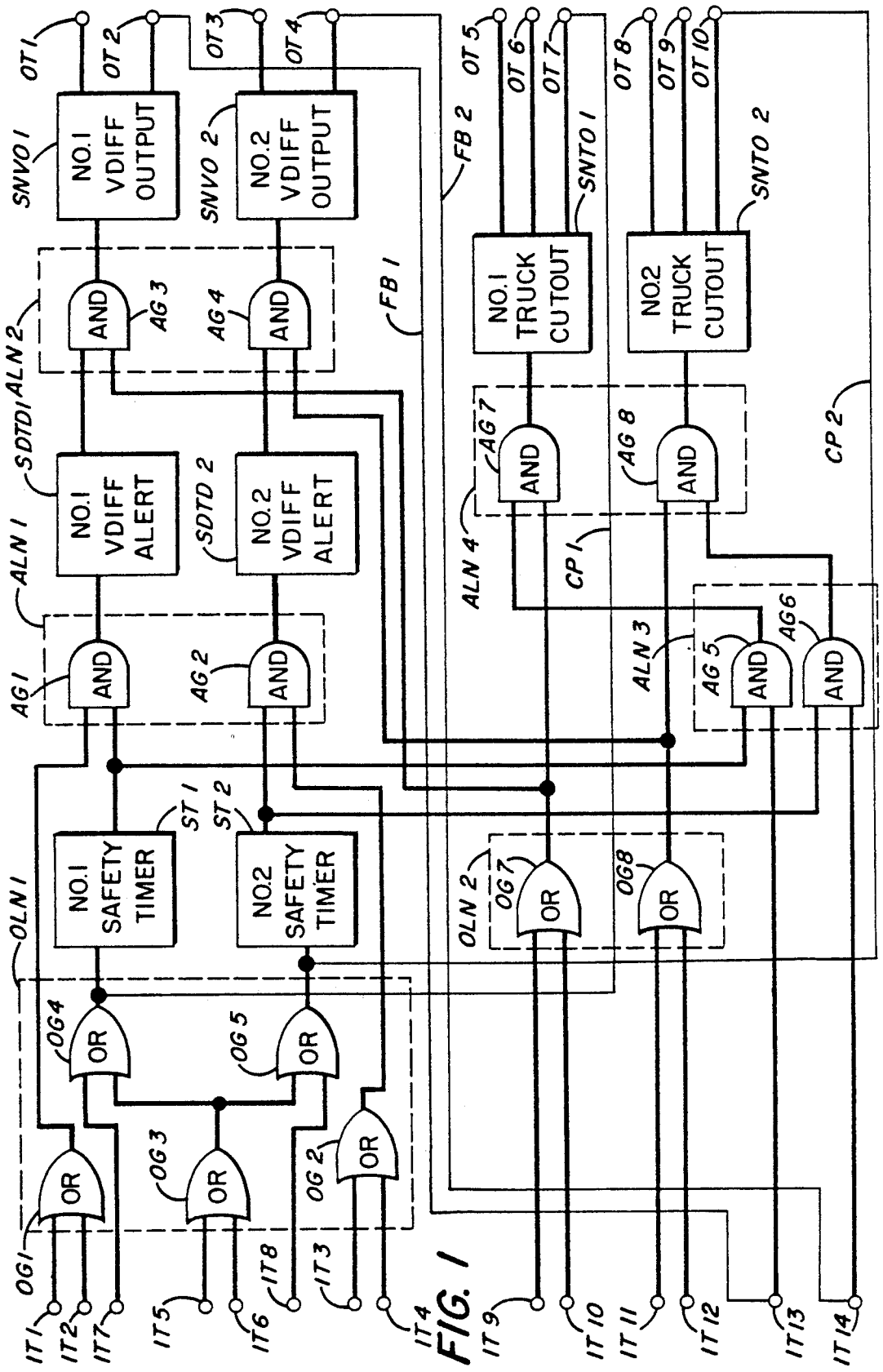
FIG. 1 is a schematic circuit diagram of an axle health discriminatory safety timer arrangement in accordance with the present invention.

Referring now to the drawings, and in particular to FIG. 1, there is shown a schematic circuit block diagram of an axle health discriminatory safety timer for use on a multiple-axle vehicle. It will be appreciated that the present safety timer is made up of a plurality of logic networks which are suitably interconnected to appropriate electronic circuits for performing the unique functional operation of the subject invention.

As shown, a first OR logic network OLN1 includes a first two-input OR gate OG1 which has one input connected to terminal IT1 while the other input is connected to terminal IT2. The logic input signal appearing on terminal IT1 is derived from a speed difference
} threshold detection sensor of one wheel axle unit of a first truck of the vehicle while the logic input signal appearing on terminal IT2 is derived from a speed difference threshold detection sensor of the other wheel axle unit of the first truck. Each of the speed difference threshold detection sensors functions in substantially the same manner for determining if a particular or one axle speed is within a speed varying range of the related or other axle on the truck. For example, if the related axle speed minus the particular axle speed of the first truck is greater than or equal to a predetermined speed set point, the output of the respective speed difference threshold detection sensor is a logical "1". Conversely, if the other axle speed minus the one axle speed of the first truck is less than and not equal to the predetermined speed set point, the output of the respective sensor is a logical "0".

It will be seen that the first logic network OLN1 also includes a second two-input OR gate OG2 which has one input connected to terminal IT3 while the other input is connected to terminal IT4. The logic input signal appearing on terminal IT3 is derived from a speed difference threshold detection sensor of one wheel axle unit of a second truck of the vehicle while the logic input signal appearing on terminal IT4 is derived from a speed difference threshold detection sensor of the other wheel axle unit of the second truck. Again, if the other axle speed minus the one axle speed of the second truck is greater than or equal to a predetermined speed set point, the output of the respective speed difference threshold detection sensor is a logical "1". In a like manner, if the other axle speed minus the one axle speed of the second truck is less than and not equal to the predetermined speed set point, the output of the respective speed difference threshold detection sensor is a logical "0".

The following Table is a listing of the set point variations with respect to the various vehicle speeds.

| Vehicle Speed | SDTD Set Point |
| --- | --- |
| <16 mph | 4 mph |
| 16–32 mph | 6 mph |
| 32–48 mph | 8 mph |
| 48–64 mph | 9 mph |
| 64–80 mph | 10 mph |
| 80–96 mph | 12 mph |
| 96–112 mph | 13 mph |
| <112 mph | 14 mph |

It will be noted that the first logic network OLN1 includes a third two-input OR gate OG3 which has one input connected to terminal IT5 while the other input is connected to terminal IT6. The logic input signal appearing on terminal IT5 is produced by a zero speed sensor. It will be understood that a zero speed value is defined as a velocity that is under 3.5 miles per hour (mph) when the velocity of the vehicle is decreasing and is defined as a velocity that is under 4.5 miles per hour (mph) when the velocity of the vehicle is increasing. This function is performed on a per truck basis. In practice, the zero speed sensor has three inputs which are received from the highest speed determination sensor, the synchronous table enable OR circuit, and the primary table enable OR circuit. The zero speed sensor receives an input signal proportional to the specific speed from the highest speed determination sensor and compares it with a speed value of 3.5 mph. The sensor functions in a set and reset manner so that if the input speed signal from the highest speed determination sensor is less than 3.5 mph and if the input signals from the synchronous table enable OR circuit and the primary table enable OR circuit are both a logical "0", the output signal of the zero speed sensor is a logical "1". Conversely, if the input speed signal from the highest speed determination sensor is greater than 4.5 mph, the output of the zero speed sensor is reset to a logical "0". Further, if the input speed signal from the highest speed determination sensor is less than or is equal to 3.5 mph and the input signals from the synchronous table enable OR circuit and the primary table enable OR circuit are both a logical "1", the output of the zero speed sensor will remain a logical "0" for three (3) seconds and then the output will reset to a logical "1". The logic input signal appearing on terminal IT6 is derived from an "In Power" device and may be produced by a brake release pressure switch or may be a discrete signal generated by the propulsion equipment. The input signal will indicate whether the train is in a power mode or a braking mode. If the train is in the power mode, the output of the sensor will be a logical "1" otherwise the output will be a logical "0".

It will be seen that the first logic network includes a fourth two-input OR gate OG4 which has one input connected to terminal IT7 and the other input connected to the output of the OR gate OG3. The logic signal appearing on input terminal IT7 will signify the activation of the cutout relay of the first truck of the vehicle.

As shown, the first logic network includes a fifth two-input OR gate OG5 which also has one input connected to the output of the OR gate OG3 and which has the other input connected to terminal IT8. The logic signal appearing on input terminal IT8 will signify the activation of the cutout relay of the second truck of the vehicle.

It will be noted that the output of the OR gate OG4 is connected to the input of the NO. 1 safety timer ST1 for the first truck of the vehicle while the output of the OR gate OG5 is connected to the input of the NO. 2 safety timer ST2 for the second truck of the vehicle. The specific safety timer for each truck self increments with each process cycle of the system. Each of the timers is reset to a zero (0) state or condition when the input to the OR gate OG3 from the input power device on terminal IT5 is a logical "1" and/or when the input to the OR gate OG3 from the zero speed sensor on terminal IT6 is a logical "1" which is conveyed to the respective safety timers ST1 and ST2 via OR gates OG4 and OG5. In addition, it will be noted that the safety timer ST1 is reset to a zero state when the input terminal IT7 of the OR gate OG4 assumes a logical "1" which confirms the fact that the cutout relay of the first truck has been activated and that the safety timer ST2 will be reset to a zero state when the input terminal IT8 of the OR gate OG5 assumes a logical "1" which acknowledges that the cutout relay of the second truck is energized.

It will be seen that the output of the NO. 1 safety timer ST1 is connected to a second logic network ALN1 which includes a first two-input AND gate AG1 and a second two-input AND gate AG2. As shown, the one input of a first two-input AND gate AG1 while the other input of the AND gate AG1 is connected to the output of the OR gate OG1. It will be seen that the output of the first AND gate AG1 is connected to the input of a first speed difference threshold detection sensor or NO. 1 VDIFF alert gate circuit SDTD1. Similarly, the output of the NO. 2 safety timer ST2 is connected to one input of the second two-input AND gate AG2 while the other input of the AND gate AG2 is connected to the output of the OR gate OG2. It will be observed that the output of the second AND gate AG2 is connected to the input of a second speed difference threshold detection sensor or NO. 2 VDIFF alert gate circuit SDTD2. Each of the first and second speed difference threshold sensors performs the function of determining if a particular axle speed is within a speed varying range of the other axle on the truck. If the other axle speed minus the one axle speed is greater than or equal to a speed determined set point, the output of the given sensor will be a logical "1". If not, the output of the sensor will be a logical "0". The following Table gives the speed determined set points for the various speeds of the vehicle.

| Vehicle Speed | SDTD Set Point |
| --- | --- |
| <16 mph | 4 mph |
| 16–32 mph | 6 mph |
| 32–48 mph | 8 mph |
| 48–64 mph | 9 mph |
| 64–80 mph | 10 mph |
| 80–96 mph | 12 mph |
| 96–112 mph | 13 mph |
| <112 mph | 14 mph |

It will be appreciated that the output of the first alert gate sensor SDTD1 will be a logical "1" whenever the input from the safety timer ST1 exceeds a preset level, namely, three (3) seconds, and the input from the OR gate OG1 is equivalent to a logical "1". Similarly, the output of the second alert gate sensor SDTD2 will be a logical "1" whenever the input from the safety timer ST2 exceeds a predetermined level, namely, three (3) seconds, and the input from the OR gate OG2 is equivalent to a logical "1".

As shown, the first alert gate sensor SDTD1 is connected to a third logic network ALN2 which includes a pair of two-input AND gates AG3 and AG4. As shown, the output of the first alert gate sensor SDTD1 is connected to one input of a third two-input AND gate AG3 while the output of the second alert sensor SDTD2 is connected to one input of a fourth two-input AND gate AG4. The other input to the AND gate AG3 is connected to the output of a seventh two-input OR gate OG7 of a fourth logic network OLN2 while the other input of the AND gate AG4 is connected to the output of an eighth two-input OR gate OG8 of the fourth logic network OLN2. It will be seen that the two-input OR gate OG7 has one input connected to terminal IT9 while the other input of the two-input OR gate OG7 is connected to terminal IT10. The logic input signal appearing on the terminal IT9 is derived from a speed fault determination period sensor of one axle of the first truck of the vehicle while the logic input signal on the terminal IT10 is derived from a speed fault determination period sensor of the other axle of the first truck of the vehicle. Similarly, the two-input OR gate OG8 has one input connected to terminal IT11 while the other input of the two-input OR gate OG11 is connected to terminal IT12. The logic input signal appearing on terminal IT11 is derived from a speed fault determination period sensor of one axle of the second truck of the vehicle while the logic input signal appearing on terminal IT12 is derived from a speed fault determination period sensor of the other axle of the second truck of the vehicle.

Each of the speed fault determination period sensors includes two inputs, one of which is connected to a speed comparison circuit and the other of which is connected to a diagnostic reset sensor. The speed comparison circuit compares the axle speed being checked with the other axle speed on the particular truck of the vehicle. In practice, there are three inputs to each of the speed comparison sensors. Two of the inputs are the speeds of the two axles being compared and the third input is derived from the speed diagnostic comparison value table. The function is performed on a per truck basis. The two axle speed values are compared by subtracting the speed value of one axle with the speed value of the other axle. The difference or resulting value is then compared with the input value from the speed diagnostic comparison value table, and if the resulting value is greater than or equal to the value of the speed diagnostic comparison value table input, the output of the speed comparison sensor will be a logical "1", and if not, then the output will be a logical "0". Now, if the speed fault determination period sensor receives a continuous logical "1" from the speed comparison sensor for seven (7) seconds, its output will be a logical "1". The speed fault determination sensor will maintain the logical "1" until it is reset by a logical "1" input received from the speed diagnostic comparison value table sensor. Now, if the speed fault determination period sensor does not receive a continuous logical "1" input from the speed comparison sensor for seven (7) seconds, its output will remain at a logical "0".

Let us assume that either one or both of the speed fault determination period sensors produce a logical "1" signal on terminals IT9 and IT10, then the output of the OR gate OG7 will go to a logical "1" which is conveyed to one of the inputs of the third two-input AND gate AG3. Now, if at the same time the VDIFF alert sensor SDTD1 supplies a logical "1" signal to the other input of the two-input AND gate AG3, the AND gate AG3 produces a logical "1" which is fed to the input of the NO. 1 VDIFF output circuit SNVO1. This causes the activation of the VDIFF output circuit SNVO1 so that it sends an input signal via output terminal OT1 to the tractive effort output circuit. Thus, the signal on terminal OT1 causes the restoration of the tractive effort of the vehicle. At the same time, the NO. 1 VDIFF output circuit also supplies an input signal to output terminal OT2 which is connected to the NO. 1 magnet valve driver for causing the magnet valve to go to an application state. As shown, the output terminal OT2 is also connected to input terminal IT13 via a feedback loop or circuit FB1. Similarly, if one or both of the speed fault determination period sensors produce a logical "1" signal on terminals IT11 and IT12, then the output of the OR gate OG8 will go to a logical "1" which is conveyed to one of the inputs of the two-input AND gate AG4. Now, if at the same time the VDIFF alert sensor SDTD2 also supplies a logical "1" signal to the other input of the two-input AND gate AG4, the AND gate AG4 produces a logical "1" which is fed to the input of the NO. 2 VDIFF output circuit SNVO2. This causes the activation of the VDIFF output circuit SNVO2 so that it conveys an input signal to the tractive effort output terminal OT3 and to the NO. 2 magnet valve driver output terminal OT4. This causes the restoration of the tractive effort and results in the actuation of the magnet valve for establishing an application condition. As shown, the output terminal OT4 is also connected to the input terminal IT14 via a feedback loop or circuit FB2.

As previously mentioned, the inputs supplied to terminals IT9, IT10, IT11, and IT12 from each respective speed fault determination period sensor for each axle will be a logical "1" when the difference between the velocity of one axle and the velocity of the other axle on the respective trucks is greater than or equal to a speed varying set point. This is a dynamic check for any condition above a preset velocity. The output of each of the respective safety timers is a function of the existing time value of each timer, such as, a one (1) second, a two (2) second, or a three (3) second count.

It will be noted that an input terminal IT13 is connected to one input of a two-input AND gate AG5 of the fifth logic network ALN3 while an input terminal IT14 is connected to one input of a two-input AND gate AG6 of the fifth logic network ALN3. The other input of the two-input AND gate AG5 is connected to the output of the NO. 1 safety timer ST1 while the other input of the AND gate AG6 is connected to the output of the NO. 2 safety timer ST2. As shown, the output of the two-input AND gate AG5 is connected to one input of the two-input AND gate AG7 of the sixth logic network ALN4 while the other input of the two-input AND gate AG7 is connected to the output of the OR gate OG7. Similarly, the output of the two-input AND gate AG6 is connected to one input of a two-input AND gate AG8 of the sixth logic network ALN4 while the other input of the two-input AND gate AG8 is connected to the output of the OR gate OG8. It will be seen that the output of the AND gate AG7 is fed to the input of the NO. 1 truck cutout circuit SNTO1 while the output of the AND gate AG8 is fed to the NO. 2 truck cutout circuit SNTO2. Each of the truck cutout circuits SNTO1 and SNTO2 has three (3) output terminals. For example, the NO. 1 truck cutout circuit SNTO1 has output terminals OT5, OT6 and OT7 while the NO. 2 truck cutout circuit SNTO2 has output terminals OT8, OT9 and OT10. In practice, the terminal OT5 supplies an output signal to the NO. 1 magnet valve cutout relay, the terminal OT6 is connected to a failure code RAM and the terminal OT7 is connected to the input of the NO. 1 safety timer ST1. In a like manner, the terminal OT8 feeds an output to the NO. 2 magnet valve cutout relay, the terminal OT9 is connected to the failure code RAM, and the terminal OT10 is connected to the NO. 2 safety timer ST2.

It will be seen that a feedback loop or circuit path FB1 extends from the NO. 1 magnet valve driver output terminal OT2 to the input terminal IT13 and a feedback circuit or loop FB2 is connected from the NO. 2 magnet driver output terminal OT4 to the input terminal IT14. The input signal fed to terminals IT13 and IT14 is a logical "1" when the specific magnet valve is in a predetermined state. In practice, a logical "1" is produced when the particular magnet valve is commanded to go to a brake application state, and if not, it is a logical "0".

In describing the operation, let us assume that the NO. 1 safety timer ST1 has exceeded the preset time limit so that a logical "1" is fed to one input of the two-input AND gate AG5. Now, if at the same time, the NO. 1 magnet valve driver is not in the required state, the feedback loop FB1 will supply a logical "1" to input terminal IT13 and, in turn, to the other input of AND gate AG2. Thus, the AND gate AG5 produces a logical "1" which is applied to one of the two inputs of AND gate AG7 and is used as a conditional check. Under this condition, if the OR gate OG7 is gated on by a logical "1" appearing on either or both terminals IT9, IT10 from the respective speed fault determination period sensor of the axles of the first truck of the vehicle, a logical "1" will be applied to the other input of the two inputs of the AND gate AG7. Thus, the AND gate AG7 is gated on and a logical "1" is supplied to the input of the NO. 1 truck cutout circuit SNTO1. Hence, the NO. 1 truck cutout circuit SNTO1 is activated and will result the following conditions. First, the truck cutout circuit SNTO1 produces a cutout or disable code signal, such as, a logical "0", on output terminal OT5, which is conveyed to the NO. 1 magnet valve cutout relay for causing its disablement. Second, the truck cutout circuit SNTO1 produces a specific code signal on output terminal OT6 which is conveyed to a failure code RAM to cause the system error log to generate an appropriate seven (7) segment error code display, such as alphanumeric characters or the like. Third, the truck cutout circuit SNTO1 produces a reset signal which is conveyed via circuit path CP1 to the NO. 1 safety timer ST1 to cause the count of the timer to return to zero.

Now, let us assume that the NO. 2 safety time ST2 has surpassed the preset time limit so that a logical "1" is fed to one input of the two-input AND gate AG6. Correspondingly, if the NO. 2 magnet valve driver is not in the required state, the feedback loop FB2 will convey a logical "1" to terminal IT14 and, in turn, to the other input of the two-input AND gate AG6. Accordingly, the AND gate AG6 is gated on to produce a logical "1" which is fed to one input of the two-input AND gate AG8 and is also used as a conditional check. If at this time the OR gate OG8 is gated on by a logical "1" appearing on either or both terminals IT11, IT12 from the respective speed fault determination period sensors of the axles of the second truck of the vehicle, a logical "1" will be conveyed to the other input of the two-input AND gate AG8. Thus, the AND Gate AG8 is gated on and a logical "1" input is fed to the NO. 2 truck cutout circuit SNTO2. Hence, the NO. 2 truck cutout circuit SNTO2 is activated and will execute a number of tasks or functions. For example, the truck cutout circuit SNTO2 generates a cutout or disable code logical "1" or "0" signal on output terminal OT8 for disabling the NO. 2 magnet valve cutout relay. Next, the truck cutout circuit SNTO2 generates a specific code signal on the output terminal OT9 which is fed to the failure code RAM to cause the system error log to produce a particular seven (7) segment alphanumeric error code display. Finally, the truck cutout circuit SNTO2 generates a reset signal on terminal OT10 which is sent to the NO. 2 safety timer ST2 via circuit path CP2 to reset the timer to a zero count. Thus, the safety timer functions to negate the slip control on a per-truck basis during the occurrence of a malfunction which can result in an extended release of the brake cylinder pressure.

Figure 2:
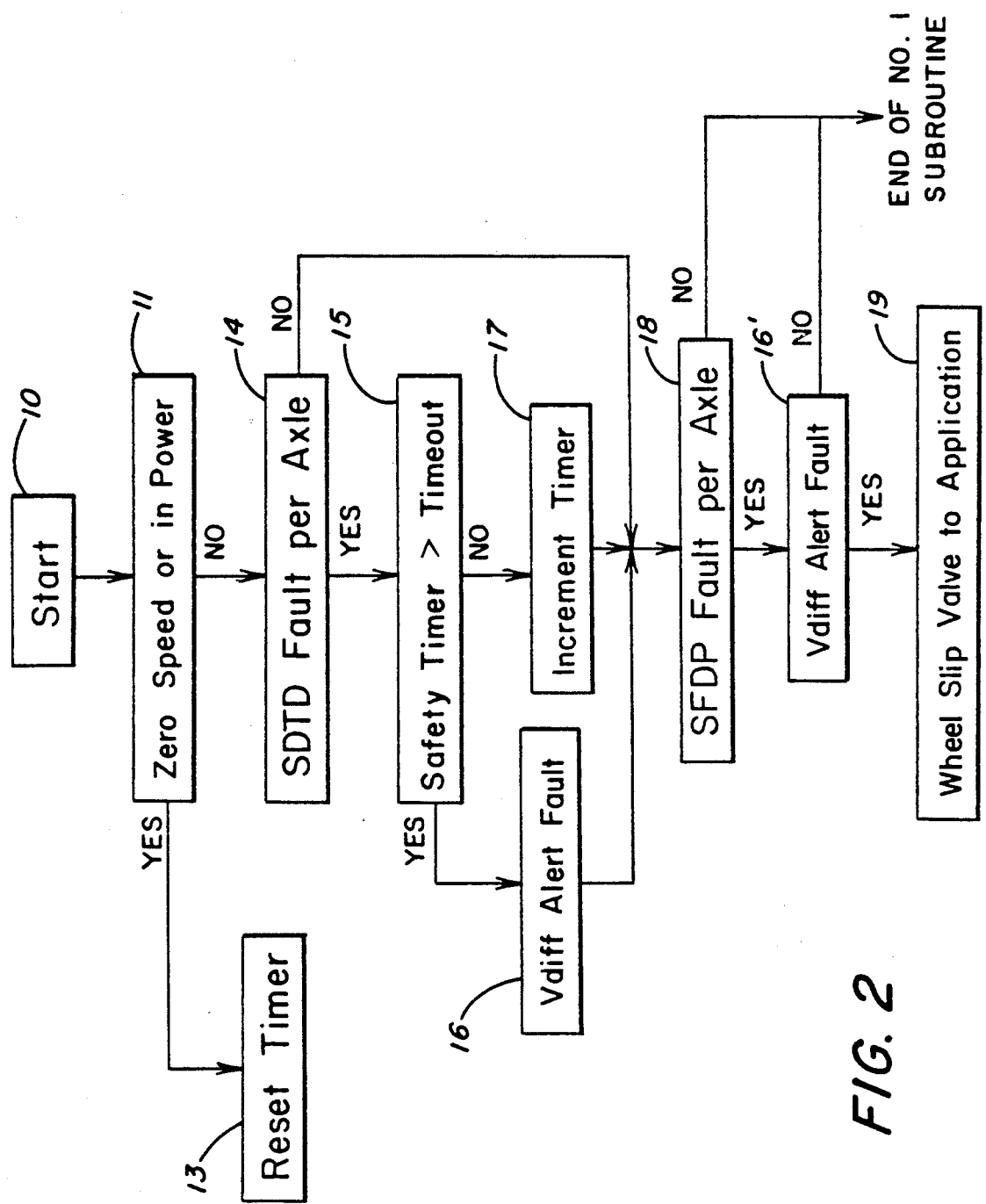
FIG. 2 is a flow chart illustrating one functional sub-routine carried out by the circuit of FIG. 1.

Turning now to the flow chart of FIG. 2, it will be seen that a sequence of operations is initiated by a start signal emanating from the Start block 10. The START signal is fed to the Zero Speed or in Power block 11 which outputs a "YES" if the railway vehicle either is stopped and at Zero Speed or is in an in Power mode, and outputs a "NO" if the vehicle is not at Zero Speed or in the in Power mode. The "YES" output resets the respective safety timer to a zero state by the Reset Timer block 13. The "NO" output is fed to the speed difference threshold detection SDTD Fault Per Axle block 14 which, as previously mentioned, performs a comparison function between the one and the other axles on the particular truck of the vehicle. That is, if the other axle speed minus the given axle speed is greater than or equal to a speed determined set point, the SDTD Fault Per Axle block 14 outputs a "YES" signal, and if not, then it outputs a "NO" signal. The "YES" signal is applied to the Safety Timer>Timeout block 15 while the "NO" signal is fed to a junction point J1. If the Safety Timer is greater than the safety timeout limit, then the block 15 conveys a "YES" signal to the VDIFF Alert Fault block 16, and if not, a "NO" signal is conveyed to the Increment Timer block 17. The "YES" signal conditions the VDIFF Alert block 16 to a true state which is conveyed to the junction point J1. Alternatively, when the "NO" signal is fed to the Increment Timer block 17, it also outputs a signal to the junction point J1 after an incremental update. As shown, the junction point J1 is connected to the input of the speed fault determination period SFDP Fault Per Axle block 18 which conditions the VDIFF Alert Fault block 16' if a "YES" signal is produced by the SFDP Fault Per Axle block 18. Conversely, if a "NO" signal is produced by the SFDP Fault Per Axle block 18, the NO. 1 subroutine is ended. It will be seen that the "YES" signal is conveyed to the VDIFF Alert Fault block 16' which produces either a "NO" signal to end the NO. 1 subroutine or a "YES" signal which is fed to a Wheel Slip Value to Application block 19 which causes the command magnet valve to go to an application state.

Figure 3:
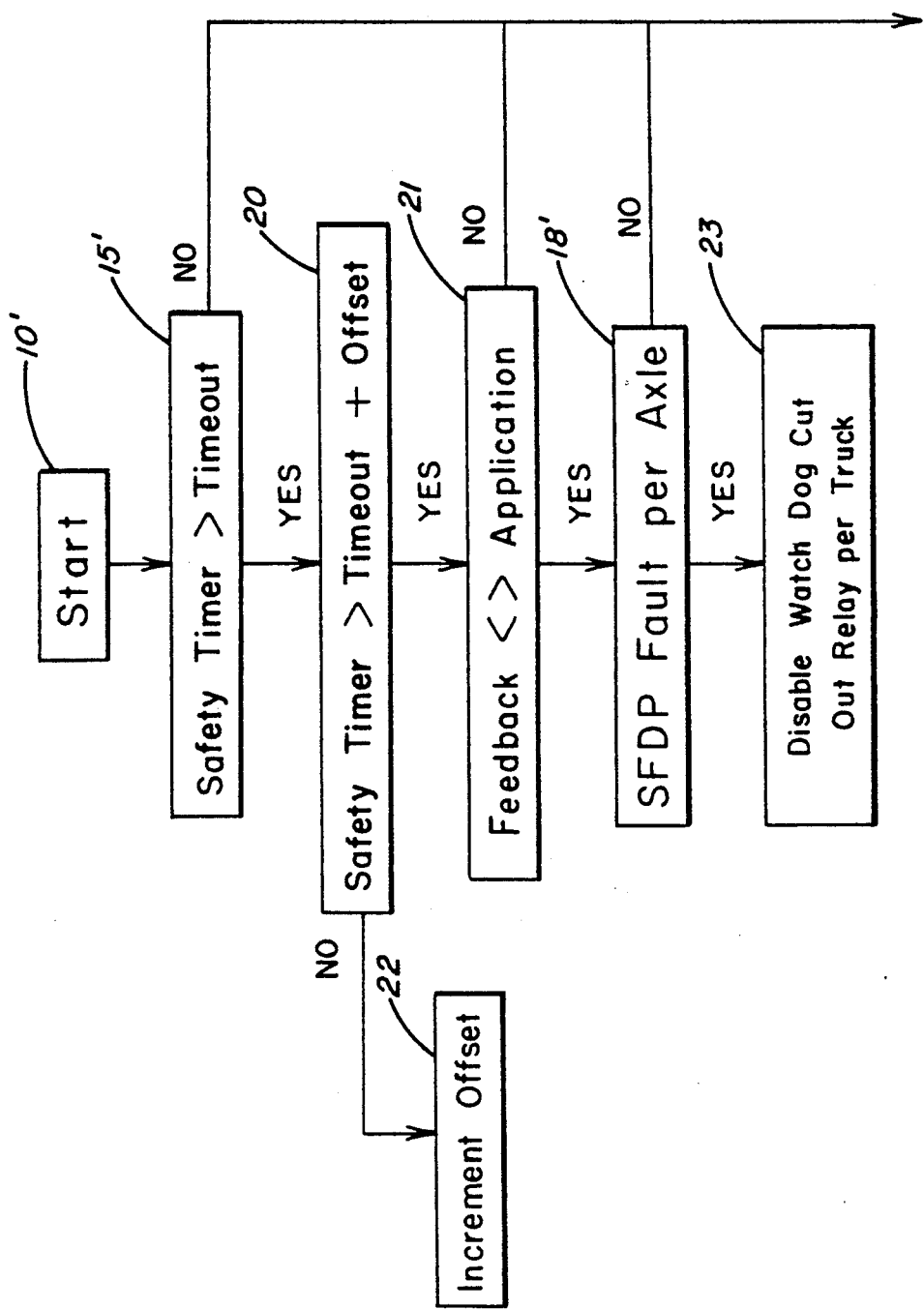
FIG. 3 is a flow chart illustrating another functional sub-routine carried out by the circuit of FIG. 1.

Turning now to FIG. 3, there is shown a second flow chart illustrating a second subroutine. It will be seen that a sequence of operations is also initiated by a START signal produced by the Start block 10'. The START signal is fed to the Safety Timer>Timeout block 15'. If the Safety Timer is greater than the timeout limit, then the block 15, outputs a "YES" signal to the Safety Timer>Timeout+Offset block 20, and if not, a "NO" signal is outputted to end the NO. 2 subroutine. If the safety timer is greater than the timeout limit plus a given offset, then the block 20 feeds a "YES" signal to the Feedback<>Application block 21, and if not, a "NO" signal is fed to the Increment Offset block 22. The block 21 produces a "NO" signal which ends the NO. 2 subroutine and produces a "YES" signal which is fed to the SFDP Fault Per Axle block 18'. As shown, a "YES" signal produced by the SFDP Fault Per Axle block 18 conditions the Disable Watchdog Cutout Relay Per Truck block 23 while a "NO" signal produced by the SFDP Fault Per Axle block 18' also ends the NO. 2 subroutine.

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

We claim:

1. An axle health discriminatory safety timer arrangement for a braking system of a multiple-axle vehicle comprising, a first logic network having a plurality of inputs responsive to the operational conditions on the vehicle, the output of said first logic network being connected to the input of a pair of safety timers, the output of said pair of safety timers being connected to the input of a second logic network, the output of said second logic network being connected to the input of a pair of speed difference threshold detection sensors, the output of said pair of speed difference detection sensors being connected to the input of a third logic network, the output of a pair of output logic network being connected to the input of a pair of output circuits, the output of said pair of safety timers also being connected to the input of a fourth logic network, the output of a fifth logic network being connected to the input of said third logic network and also being connected to the input of a sixth logic network, and the output of said sixth logic network being connected to the input of a pair of truck cutout circuits for nullifying the slip control on the multiple-truck vehicle for preventing an over-extended period of time of release of the brake cylinder pressure.

2. The axle health discriminatory safety timer arrangement, as defined in claim 1, wherein said first logic network includes a plurality of OR gates.

3. The axle health discriminatory safety timer arrangement, as defined in claim 2, wherein each of said plurality of OR gates being a two-input circuit.

4. The axle health discriminatory safety timer arrangement, as defined in claim 1, wherein said second logic network includes a plurality of AND gates.

5. The axle health discriminatory safety timer arrangement, as defined in claim 4, wherein each of said plurality of AND gates being a two-input circuit.

6. The axle health discriminatory safety timer arrangement, as defined in claim 1, wherein said third logic network includes a plurality of AND gates.

7. The axle health discriminatory safety timer arrangement, as defined in claim 6, wherein each said plurality of AND gates being a two-input circuit.

8. The axle health discriminatory safety timer arrangement, as defined in claim 1, wherein said fourth logic network includes a plurality of AND gates.

9. The axle health discriminatory safety timer arrangement, as defined in claim 8, wherein each of said plurality of AND gates being a two-input circuit.

10. The axle health discriminatory safety timer arrangement, as defined in claim 1, wherein said fifth logic network includes a plurality of OR gates.

11. The axle health discriminatory safety timer arrangement, as defined in claim 10, wherein each of said plurality of OR gates being a two-input circuit.

12. The axle health discriminatory safety timer arrangement, as defined in claim 1, wherein said sixth logic network includes a plurality of AND gates.

13. The axle health discriminatory safety timer arrangement, as defined in claim 12, wherein each of said plurality of AND gates being a two-input circuit.

14. The axle health discriminatory safety timer arrangement, as defined in claim 1, wherein one feedback path extends from one of said pair of output circuits to one of said pair of safety timers.

15. The axle health discriminatory safety timer arrangement, as defined in claim 14, wherein another feedback path extends from the other of said pair of output circuits to the other of said pair of safety timers.

16. The axle health discriminatory safety timer arrangement, as defined in claim 1, wherein one circuit path extends from one of said pair of truck cutout circuits to said fifth logic network.

17. The axle health discriminatory safety timer arrangement, as defined in claim 16, wherein another circuit path extends from the other of said pair of truck cutout circuits to said fifth logic network.

18. The axle health discriminatory safety timer arrangement, as defined in claim 1, wherein said first logic network includes five two-input OR gates.

19. The axle health discriminatory safety timer arrangement, as defined in claim 1, wherein said fifth logic network includes two two-input OR gates.

20. The axle health discriminatory safety timer arrangement, as defined in claim 1, wherein said second, third, fourth, and sixth logic networks each includes a two two-input AND gate.

21. An axle health discriminatory safety timer arrangement for a braking system of a multiple-axle vehicle comprising, a first logic means having a plurality of inputs responsive to the operational conditions on the vehicle, the output of said first logic network controlling the input supplied to a pair of safety timers, the output of said pair of safety timers being connected to the input of a second logic means, the output of said second logic means controlling the input supplied to a pair of speed difference threshold detection sensors, the output of said pair of speed difference detection sensors being connected to the input of a third logic means, the output of said third logic means controlling the input supplied to a pair of output circuits, the output of said pair of safety timers also being connected to the input of a fourth logic means, the output of a fifth logic means being connected to the input of said third logic means and also being connected to the input of a sixth logic means, and the output of said sixth logic means controlling the input supplied to a pair of truck cutout circuits to nullify the slip correction on the multiple-truck vehicle for preventing an over-extended period of time of release of the brake cylinder pressure.

22. The axle health discriminatory safety timer arrangement, as defined in claim 21, wherein said first logic means is made up of a plurality of OR gates.

23. The axle health discriminatory safety timer arrangement, as defined in claim 21, wherein said second logic means is made up of a plurality of AND gates.

24. The axle health discriminatory safety timer arrangement, as defined in claim 21, wherein said third logic means is made up of a plurality of AND gates.

25. The axle health discriminatory safety timer arrangement, as defined in claim 21, wherein said fourth logic means is made up of a plurality of AND gates.

26. The axle health discriminatory safety timer arrangement, as defined in claim 21, wherein said fifth logic means is made up of a plurality of OR gates.

27. The axle health discriminatory safety timer arrangement, as defined in claim 21, wherein said sixth logic means is made up of a plurality of AND gates.

28. The axle health discriminatory safety timer arrangement, as defined in claim 21, wherein said first logic means includes five two-input OR gates.

29. The axle health discriminatory safety timer arrangement, as defined in claim 21, wherein said fifth logic means includes two two-input OR gates.

30. The axle health discriminatory safety timer arrangement, as defined in claim 21, wherein said second, third, fourth, and sixth logic means each includes a two two-input AND gate.

* * * * *